June 6, 1961  G. D. ALLARDICE  2,987,444
PREPARATION OF A GELATIN-VITAMIN MIXTURE
Filed Sept. 17, 1957
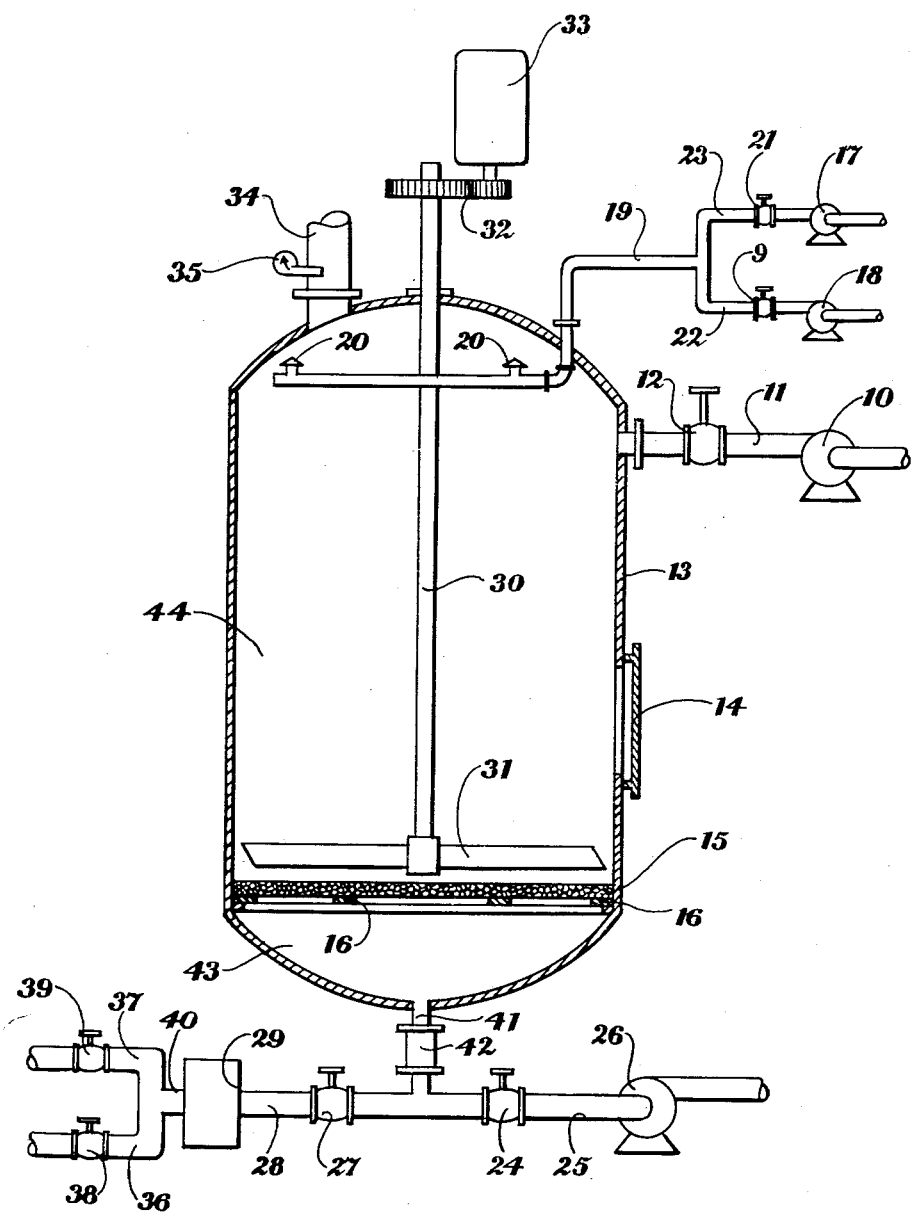
Gordon D. Allardice
INVENTOR.
R. Frank Smith
BY James R. Frederick
ATTORNEYS United States Patent Office 2,987,444
Patented June 6, 1961

2,987,444
PREPARATION OF A GELATIN-VITAMIN MIXTURE
Gordon D. Allardice, Rochester, N.Y., assignor to Eastman Kodak Company, Rochester, N.Y., a corporation of New Jersey
Filed Sept. 17, 1957, Ser. No. 684,473
7 Claims. (Cl. 167—81)

This invention relates to particulate gelatin and more particularly, to methods and apparatus for solvent treating, filtering and drying mixtures of an oil and particulate gelatin containing medicinals such as vitamins.

Gelatin in particulate form is commonly employed as a carrier material for medicinals. Several methods have been proposed for preparing gelatin containing medicinals in particulate form. One of such methods comprises agitating a medicinal such as a vitamin A material with an aqueous solution of gelatin to produce an emulsion. The resulting emulsion is then dispersed in an immiscible oil such as mineral oil, castor oil, or the like, to produce a polyphase dispersion. This polyphase dispersion is then cooled until droplets of gelatin solidify. Another process for preparing particulate gelatin containing medicinals comprises preparing an emulsion of gelatin containing a medicinal and extruding this emulsion by centrifugal force through holes in the peripheral wall of a spinning cup positioned in a suitable oil. As the emulsion of gelatin is extruded through the holes in the cup, it is sheared off or subdivided into droplets which solidify into spheroidal particles in the oil.

In both the "polyphase dispersion" and "spinning cup" processes described above for preparing particulate gelatin, the particulate gelatin must be separated from the resulting oil mixture by filtration and by treatment with solvents, and thereafter dried in order to acquire a desired non-tacky, free-flowing form. However, such a sequence of steps by known methods entails the use of several pieces of equipment including solvent treating, filtering and drying apparatus, in addition to several handling steps. In the manufacture of particulate gelatin containing medicinals, possible contamination resulting from such multiple handling is to be avoided.

It is therefore an object of this invention to provide a new and improved means for treating particulate gelatin in admixture with an oil.

It is another object of this invention to provide a novel process for solvent treating, filtering and drying oil slurrys of particulate gelatin containing medicinals such as vitamins.

It is still another object of this invention to provide a new solvent treating, filtering and drying apparatus.

It is also an object of this invention to provide a new method for treating particulate gelatin containing thereon an oil such as mineral oil with a minimum of handling.

It is likewise an object of this invention to provide an improved process particularly adapted for treating oil mixtures of particulate gelatin containing heat labile medicinals such as vitamin A materials.

These and other objects are attained by means of this invention as described more fully hereinafter with reference to preferred embodiments thereof as illustrated in the drawing and as described hereinafter.

The drawing is a view in elevation and partly in section illustrating somewhat schematically an embodiment of the apparatus of the present invention.

In a typical operation of the apparatus illustrated by the drawing, a mixture of particulate gelatin and oil is pumped by means of pump 10 through inlet conduit 11 to enclosed chamber 13 and thereafter is deposited on filter plate 15 supported by grating 16. The material deposited on filter plate 15 is stirred with stirrer 31 attached to drive-shaft 30 driven by electric motor 33 through gear train 32. Solvent is pumped into enclosed chamber 13 through spray nozzles 20 attached to conduit 19 which is connected to conduit 22 having valve 9 and solvent pump 18, and to conduit 23 having valve 21 and solvent pump 17. The apparatus can be used as a filter to filter off the solvent by producing a sub-atmospheric pressure in enclosed chamber zone 43 below filter plate 15 by means of vacuum pump 26 connected to conduit 25. Solvent is drawn through filter plate 15 to outlet conduit 41 connected to conduit 25. The apparatus can then be used to dry the resulting solvent treated particulate gelatin by forcing a stream of gas up through filter plate 15 from enclosed chamber zone 43 to enclosed chamber zone 44 above filter plate 15 and out of enclosed chamber 13 through outlet conduit 34. The gas introduced into enclosed chamber zone 43 passes through heater 29 in conduit 28 which is connected to conduit 41. Feed conduit 40 to heater 29 is connected to gas inlet conduit 37 and gas inlet conduit 36.

Apparatus of the type illustrated in the drawing is used in batch operations. After the particulate gelatin-oil mixture is deposited on filter plate 15, valve 12 included in inlet conduit 11 is closed and solvent is introduced onto the particulate gelatin on filter plate 15 through spray nozzles 20. Valve 27 is closed, valve 24 is open, and a sub-atmospheric pressure is produced in enclosed chamber zone 43 by pump 26, and the apparatus functions as a filter. Valves 9 and 21 are closed when sufficient solvent has been added to the particulate gelatin. Sight glass 42 in conduit 41 can be used to observe when all of the solvent filtrate has been removed from enclosed tank 13. Thereafter, valve 24 is closed, valve 27 is opened and gas under super-atmospheric pressure is introduced into enclosed chamber zone 43 through conduit 28 and forced up through filter plate 15 to dry and to remove residual portions of solvent on the particulate gelatin. To minimize the possibility of an explosion in the apparatus, an inert gaseous mixture is used in the drying operation until substantially all of the solvent has been removed from the system. Gas inlet conduits 36 and 37 including valves 38 and 39 respectively are used to regulate the flow of gaseous drying mixture into the system. In a preferred embodiment, gas inlet conduit 36 can be connected to a source of air under pressure and gas inlet conduit 37 can be connected to a source of an inert gas such as carbon dioxide, nitrogen, or the like, under pressure. In starting the drying operation, the ratio of inert gas to air is relatively high, and as the solvent is volatilized from the particulate gelatin on the filter plate, an increasingly larger proportionate amount of air can be employed as the drying gas. A typical gas mixture that can be used to initiate the drying cycle is a mixture of 50% air and 50% carbon dioxide. Combustible gas alarm 35 is positioned in gas outlet 34 as a means to determine the proportionate amount of inert gas needed to prevent an explosion in the system. After the solvent is substantially removed from the particulate gelatin, air can be used as the drying gas to complete the drying of the particulate gelatin to make a dry, non-tacky, free-flowing material. The particulate gelatin subjected to the drying is preferably first subjected to gaseous drying at about room temperature (20°–25° C.), and as the solvent is removed, the temperature of the gaseous drying medium is increased to remove residual traces of solvent and moisture from the surface of the gelatin particles, heater 29 serving to heat the drying gas. The elevated drying temperature increases the rate of diffusion of moisture and solvent that may be inside the particulate gelatin to the surface where it can be removed. During the drying process, the particulate gelatin can be suitably heated as high as about 45° C., although drying temperatures up to about 40° C. are more usually employed.

A minor proportionate amount of a finely powdered mineral material such as sodium silico aluminate is preferably added to the particulate gelatin after substantially all of the solvent has been removed in the latter stages of the drying to further lend non-tacky and free-flowing properties to the dried particulate gelatin. Only a minute amount of the sodium silico aluminate is retained on the surface of the particulate gelatin and the ultimate dried particulate gelatin product does not "dust" when handled or poured as most of the sodium silico aluminate additive is blown out of the system with the gaseous stream employed during the drying.

After the drying step, the resulting dry, non-tacky, free-flowing particulate gelatin is removed from the apparatus through discharge door 14. A convenient method for removing the particulate gelatin is by pneumatic suction.

Any rigid, porous filter plate can be used in the present apparatus. Suitable filter plates include porous plates made from porous carbon or graphite, porous alundum, porous silica, porous porcelain, porous stainless steel and other well-known rigid, porous filtering media. Such filtering media usually range in thickness from about $\frac{1}{16}$ to 2 inches.

The particulate gelatin on the filter plate is preferably continuously agitated or stirred during the solvent treating, filtering and drying operations to minimize channeling and localized overheating. The stirring means is disposed immediately above the filter plate, and more usually less than an inch above the filter plate. The stirring means can be any of a wide variety of types and shapes that are suitable for maintaining the particulate gelatin on the filter plate in a state of agitation. Typically the stirrer is in the form of a rake, propeller or blade actuated by an electric motor as illustrated in the drawing.

Various mixtures of particulate gelatin and oil can be treated in the present apparatus. The term "particulate" as used herein includes "globules," "droplets," "granules," "beadlets," "pearls," "spheroids" and the like. Typically the particulate gelatin treated according to the invention ranges in size from about 0.01 to 1 mm., although smaller or larger particles can be suitably treated. Particulate forms of gelatin are commonly prepared in oils by the "double emulsion" and "spinning cup" methods described hereinabove. Oils in which particulate gelatin is substantially insoluble are utilized in such processes. More usually mineral oils or such triglyceride oils as castor oil, cottonseed oil, cocoanut oil, soybean oil and related oils are used. Gelatin is a commonly employed carrier for medicinals and the present invention is particularly adapted for processing oil slurrys of particulate gelatin containing such fat-soluble vitamin materials as vitamin A acetate, vitamin A palmitate, vitamin D, vitamin E, and the like, uniformly dispersed in the gelatin carrier.

The particulate gelatin-oil mixture is treated in accordance with the present invention with a solvent to remove the oil from the gelatin. Any volatile solvent suitable for removing the oil can be employed, the type of solvent varying with the particular oil used in preparing the particulate gelatin. Suitable solvents include petroleum ethers and related hydrocarbon solvents such as hexane, as well as such chlorinated solvents as methylene chloride and dichloroethylene, and other well-known oil solvents. The solvent used should be sufficiently volatile so that substantially all traces of it can be removed from the treated gelatin during the drying step in the present process. In a preferred embodiment of the invention, the particulate gelatin-oil mixture is initially treated with a dehydrating solvent such as isopropanol, acetone, ethanol, n-propanol, dioxane, or comparable solvents having an affinity for water. Hence, a mixture of an oil solvent such as hexane and a dehydrating solvent such as isopropyl alcohol can be used if desired to wash the particulate gelatin-oil mixture on the filter plate in the present process. In a typical operation of the apparatus illustrated by the drawing, solvent pump 18 and valve 9 in conduit 22, and solvent pump 17 and valve 21 in conduit 23, can be used to blend and regulate the type and amount of solvent or solvents used. For example, hexane can be fed into the system through solvent pump 17 and isopropanol into the system through solvent pump 18. Also, a dehydrating solvent can be added directly to the particulate gelatin-oil mixture prior to being introduced into the present solvent treating, filtering and drying apparatus. While the above-described dehydrating solvents are used to facilitate the removal of water from the particulate gelatin, the solvent treating step in the present process can be suitably effected with just an oil solvent and the thus treated particulate gelatin dried or dehydrated to the desired degree by the above-described gaseous drying method.

The invention is further illustrated by the following example of a preferred embodiment thereof.

*Example*

A mineral oil slurry of solid gelatin spheroids predominately in the size range of 20 to 80 mesh and comprised of about 45% by weight of gelatin, about 25% by weight of glucose, about 15% by weight of oleostearine and about 15% by weight of a vitamin A palmitate concentrate was prepared in accordance with the procedure described in Reynolds, U.S. 2,183,084 by stirring an aqueous solution of gelatin and a molten oleaginous solution of oleostearine and vitamin A palmitate to produce an emulsion, stirring the resulting emulsion in about an equal volume of light pharmaceutical grade mineral oil and rapidly cooling the resulting polyphase dispersion to form solid gelatin spheroids. About an equal volume of isopropyl alcohol was added to the resulting mineral oil slurry which was then introduced into a solvent treating, filtering and drying apparatus of the type illustrated by the drawing. The filter plate in the apparatus was a porous silica stone about 1.5 inches in thickness. The liquid was separated from the gelatin spheroid slurry by filtration through the filter plate with suction. The gelatin spheroids were washed on the filter with about 4.5 liters of a mixture of 30% isopropyl alcohol and 70% hexane at 5° C. for each kilogram of gelatin spheroids and then again with an equal portion of hexane. The solvent after each of the washing steps was removed by filtration through the filter plate with suction. During the successive solvent treating steps, the gelatin spheroids on the filter plate were continuously stirred. Thereafter, a stream of a mixture of 50% air and 50% carbon dioxide at room temperature was blown through the filter plate from the zone below and through the gelatin spheroids thereon for about 20 minutes, the pressure differential through the filter plate being about 3.7 inches of mercury. Then the carbon dioxide was throttled down until 100% air was flowing through the gelatin. Then about .2% by weight of powdered sodium silico aluminate ("Zeolex 7") was added to the gelatin spheroids and heated air was blown through the gelatin spheroids on the filter plate from the zone below for about 3 hours, the temperature of the gelatin spheroids on the filter plate being about 40° C. and the pressure differential through the filter plate being about 2 inches of mercury. During the gaseous drying operation, the gelatin spheroids on the filter plate were continuously stirred, and appeared to be fluidized or in a state of turbulent suspension. The gelatin spheroids were removed from the filter plate by a vacuum suction conduit. The removed gelatin was in the form of non-tacky, free-flowing spheroids predominately in the size range of 20 to 80 mesh.

The present invention provides an improved means for treating particulate gelatin having an oil such as mineral oil, castor oil, or the like, on the surface thereof. As the apparatus of the present invention can be employed for all of the solvent treating, filtering and drying steps, particulate gelatin-oil mixtures can be processed with a minimum of troublesome and costly multiple handling operations characterizing prior art methods. Also, the present invention is particularly adapted for processing particulate gelatin containing heat labile medicinals such as vitamin A materials as localized overheating of the particulate gelatin in drying phase of the subject process is at a minimum.

Although the invention has been described in considerable detail with reference to certain preferred embodiments thereof, it will be understood that variations and modifications can be effected within the spirit and scope of the invention as described hereinabove and as defined by the appended claims.

I claim:

1. The process which comprises treating a mixture of particulate gelatin 0.01 to 1.0 mm. in size containing fat-soluble vitamin material and an oil in which the particulate gelatin is substantially insoluble in an enclosed filter zone on a rigid, porous filter plate with an organic solvent in which said particulate gelatin is substantially insoluble and in which said oil has substantial solubility and dissolving substantially all of said oil in said solvent, separating substantially all of the resulting oil-containing solvent from the particulate gelatin by filtration through said filter plate, the particulate gelatin being maintained in intimate contact with said solvent by agitation during the said solvent treating, introducing a stream of inert gas at a drying temperature through the said solvent-treated particulate gelatin on said filter plate counter in direction to the flow of the said oil-containing solvent filtrate through said filter plate while the said solvent-treated particulate gelatin is being agitated in said filter zone until the said solvent-treated particulate gelatin is substantially non-tacky and free-flowing.

2. The process which comprises treating a mixture of particulate gelatin 0.01 to 1.0 mm. in size containing fat-soluble vitamin material and an oil in which the particulate gelatin is substantially insoluble in an enclosed filter zone on a rigid, porous filter plate with an organic dehydrating solvent in which the particulate gelatin is substantially insoluble and removing a substantial portion of the water in the particulate gelatin with said dehydrating solvent, separating substantially all of the resulting water-containing dehydrating solvent from the particulate gelatin by filtration through said filter plate, the particulate gelatin being maintained in intimate contact with said dehydrating solvent by agitation during the said dehydrating solvent treating, treating the resulting dehydrated solvent-treated particulate gelatin on said filter plate with an organic oil solvent in which the particulate gelatin is substantially insoluble and in which said oil has substantial solubility and dissolving substantially all of said oil in admixture with the particulate gelatin, separating substantially all of the resulting oil-containing solvent from the particulate gelatin by filtration through said filter plate, the particulate gelatin being maintained in intimate contact with said oil solvent by agitation during the said oil solvent treating, introducing a stream of inert gas at a drying temperature less than 45° C. through the resulting particulate gelatin on said filter plate counter in direction to the flow of the said solvent filtrates through said filter plate while the particulate gelatin is being agitated in said filter zone until substantially all residual portions of said solvents are removed from the particulate gelatin, and thereafter introducing a second stream of inert gas at a higher drying temperature than the first said stream of gas through the resulting particulate gelatin on said filter plate counter in direction to the flow of the said solvent filtrates through the resulting particulate gelatin on said filter plate while the particulate gelatin is being agitated in said filter zone until the particulate gelatin is substantially non-tacky and free-flowing.

3. The process according to claim 2 wherein the oil is mineral oil.

4. The process according to claim 2 wherein the dehydrating solvent is isopropyl alcohol.

5. The process according to claim 2 wherein the oil solvent is hexane.

6. The process according to claim 2 wherein a minor proportionate amount of powdered sodium silico aluminate is added to the solvent treated and filtered particulate gelatin in the course of treating with the streams of gas.

7. The process which comprises treating a mineral oil slurry of particulate gelatin 0.01 to 1.0 mm. in size containing vitamin A palmitate in an enclosed filter zone on a rigid, porous filter plate with sufficient isopropyl alcohol to substantially dehydrate the particulate gelatin, separating the resulting water-containing isopropyl alcohol from the resulting dehydrated particulate gelatin by filtration through said filter plate, the particulate gelatin being maintained in intimate contact with the isopropyl alcohol by agitation during the said dehydration step, thereafter treating the said dehydrated particulate gelatin on said filter plate with sufficient hexane to dissolve substantially all of the mineral oil in admixture with said dehydrated particulate gelatin, separating the resulting oil-containing hexane from the resulting particulate gelatin by filtration through said filter plate, the particulate gelatin being maintained in intimate contact with the hexane by agitation during the said oil-removing step, introducing a stream of inert gas comprised essentially of carbon dioxide and air at a temperature of about 20° C. to 25° C. through the resulting isopropyl alcohol and hexane treated particulate gelatin on said filter plate counter in direction to the flow of the said isopropyl alcohol and hexane filtrates through said filter plate while the particulate gelatin is being agitated in said filter zone until remaining traces of isopropyl alcohol and hexane are removed from the particulate gelatin, and thereafter introducing a stream of air at a higher temperature than said stream of inert gas comprised of carbon dioxide and air up to about 45° C. through the particulate gelatin on said filter plate counter in direction to the flow of said isopropyl alcohol and hexane filtrates through said filter zone while the particulate gelatin is being agitated in said filter zone until the particulate gelatin is substantially non-tacky and free-flowing.

References Cited in the file of this patent

UNITED STATES PATENTS

| | | |
|---|---|---|
| 65,786 | Adamson | June 18, 1867 |
| 203,981 | Adamson et al. | May 21, 1878 |
| 2,126,625 | Eggleston | Aug. 9, 1938 |
| 2,183,053 | Taylor | Dec. 12, 1939 |
| 2,183,084 | Reynolds | Dec. 12, 1939 |
| 2,341,045 | Keirsted | Feb. 8, 1944 |